United States Patent [19]

Spelber

[11] 4,405,159
[45] Sep. 20, 1983

[54] WASTE DISPOSER COUPLING

[75] Inventor: Leonard G. Spelber, San Diego, Calif.

[73] Assignee: Wastemate Corporation, San Diego, Calif.

[21] Appl. No.: 274,069

[22] Filed: Jun. 16, 1981

[51] Int. Cl.³ .............................................. F16L 41/00
[52] U.S. Cl. ...................................... 285/38; 285/39; 285/158; 285/236
[58] Field of Search ............... 285/161, 236, 158, 159, 285/38, 39

[56] References Cited

U.S. PATENT DOCUMENTS

| 2,413,308 | 12/1946 | Arnold | 285/39 X |
| 2,707,967 | 5/1955 | Adams et al. | 285/158 X |
| 2,926,701 | 3/1960 | Campbell | 285/39 X |
| 3,178,206 | 4/1965 | Martin et al. | 285/161 |
| 3,281,869 | 11/1966 | Schweigaard-Olsen et al. | 285/161 X |
| 4,172,607 | 10/1979 | Norton | 285/373 X |
| 4,221,407 | 9/1980 | Steimle | 285/236 |

FOREIGN PATENT DOCUMENTS 1196120  11/1959  France ................................. 285/158

Primary Examiner—Thomas F. Callaghan
Attorney, Agent, or Firm—Brown & Martin

[57] ABSTRACT

A coupling device for coupling a waste disposer unit to a sink, including a drain conduit with a flange for fitting against the sink and a collar having external threads positioned over the conduit. A locking ring is in threaded engagement with the collar for retaining the drain conduit securely to the sink. A resilient sealing ring is positioned over the bottom of the conduit and the top of the disposer and securing means is placed over the sealing ring to hold the assembly together.

3 Claims, 2 Drawing Figures

WASTE DISPOSER COUPLING

BACKGROUND OF THE INVENTION

The present invention relates to a coupling device for connecting a waste disposer unit to a sink.

Waste disposer units are installed in the plumbing beneath a sink. These units are generally installed beneath kitchen sinks in an enclosed cabinet area where it is extremely difficult to move and work. Various types of coupling devices have been provided in the past. Most of these are metal and are complex in construction and difficult to use. Some of the more popular ones use rotational plates and threaded studs which must be adjusted with a screwdriver. Besides being difficult to install in close quarters, these metal constructions tend to corrode even though precautions such as plating are taken.

A commercial device has been sought which would be easy to manufacture and install while providing a leak-tight seal.

SUMMARY OF THE INVENTION

A device for connecting a waste disposer to a sink comprises a drain conduit with a reduced seating portion on which is secured external threaded collar means. Connector ring means is in threaded engagement with said collar means to secure said conduit against said sink. Sealing means is provided for affixing the bottom of said collar means to a disposer unit with securing means holding said sealing means in position.

It is an object of the present invention to provide a new and improved coupling device for connecting a waste disposer unit to a sink that includes a small number of simple parts and that is relatively inexpensive to manufacture.

It is another object of the present invention to provide a new and improved coupling device for connecting a waste disposer to a sink that is constructed and arranged for easy installation and cleaning.

It is a further object of the present invention to provide a new and improved coupling device for connecting a waste disposer to a sink which occupies a small amount of space and avoids the use of special tools.

IN THE DRAWINGS

DETAILED DESCRIPTION OF THE INVENTION

Figure 1:
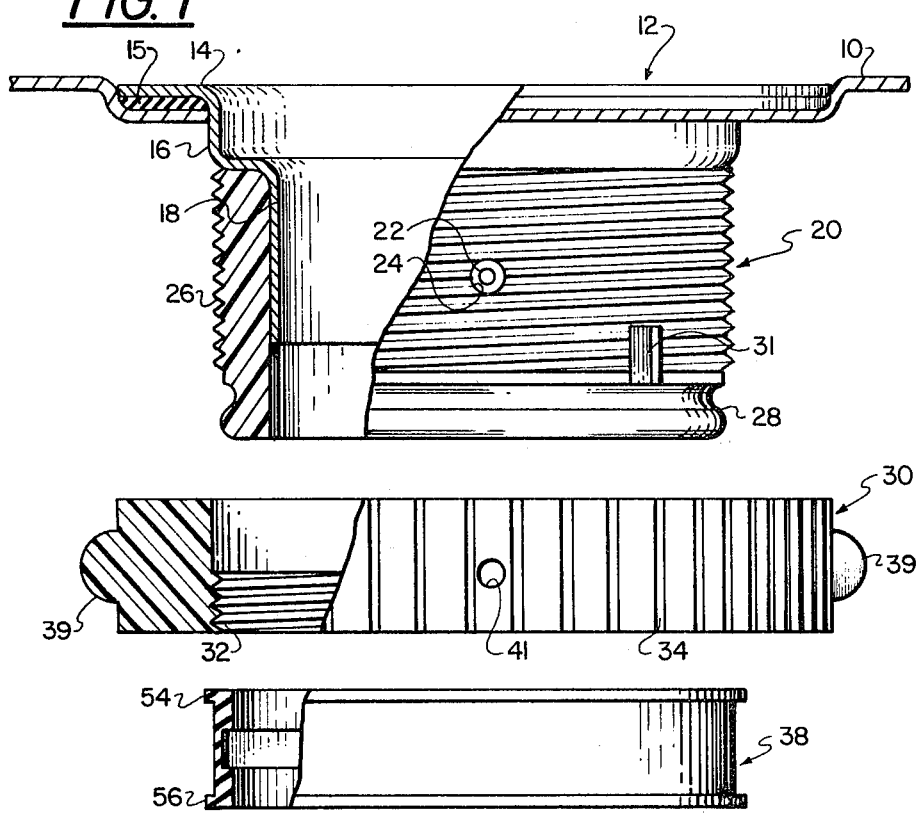
FIG. 1 is an elevation, partly sectioned, showing the coupling device of the present invention positioned on a sink prior to assembly.
Figure 2:
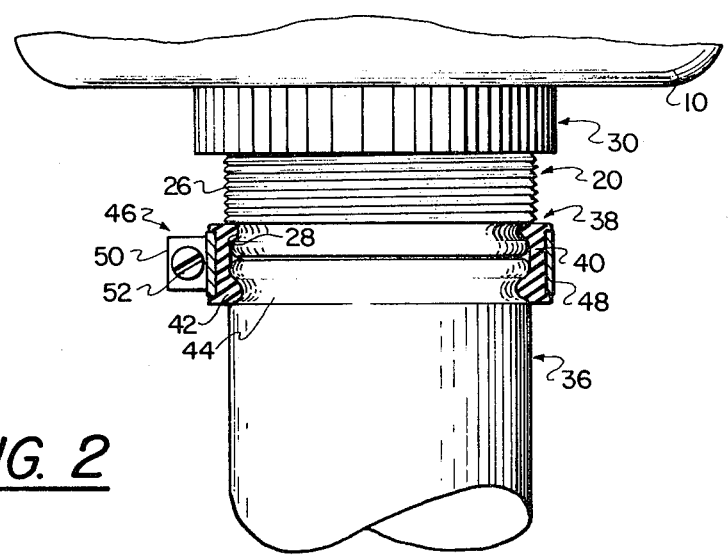
FIG. 2 is an elevation, partly sectioned, showing the coupling device of the present invention affixed in place and connecting the disposer unit to the sink.

Referring to the drawings, a sink is shown at 10. The sink has the usual drain opening and a drain conduit 12 is inserted through the opening. The conduit 12 includes a flange 14 which engages a sealing gasket or other sealing means 15 that surrounds the opening in the sink bottom. The conduit 12 also includes a downwardly extending barrel 16 with a reduced portion forming a collar seat 18. A plastic collar 20 is inserted over the collar seat 18 in a tight sliding engagement. The collar 20 is affixed to the collar seat by pop rivets 22 inserted into opening 24 in the side wall of the collar 20. Set screws or other fastening means may also be used.

The collar 20 has external threads 26 formed thereon and a sealing groove 28 adjacent the bottom. The difference between the diameter of the barrel 16 and the diameter of the reduced collar seat is such that the threads 26 on the collar 20 align vertically with the circumference of the barrel 16. This makes it possible to attach the collar 20 to the conduit 12 before inserting the assembly down through the drain opening in the sink bottom. The collar also includes spaced notches 31 which accommodate the end of a screwdriver for holding the collar in position when the connector ring 30 is attached.

After the conduit-collar assembly is inserted through the drain opening with the flange 14 engaging the sealing means 15, the plastic connector ring 30 is attached to the collar 20. The connector ring includes internal threads 32 which mate with the threads 26 on the collar 20. The threads 32 extend part way in the axial direction of the connector ring. When a relatively thin sink bottom is involved, the connector ring is applied with the threads toward the sink bottom as shown in the drawings. If a thicker sink bottom is involved, the connector ring 30 is inserted with the threads away from the sink bottom to accommodate the additional thickness. In this manner, the coupling device can be used with sink bottoms ranging in thickness from very thin to thicknesses such as ¾ inch for example. Such construction facilitates attachments to sinks that vary substantially in thickness. The connector ring 30 also has a knurl 34 formed on its circumference. This provides a good grip for tightening and loosening the ring. The connector ring 30 may include four spaced apart tabs 39 and/or four spaced apart holes 41 to aid in tightening the ring onto the collar 20. The tabs are easily engaged by the hand of the installer. The holes 41 accommodate the end of a tool such as a screwdriver for turning the ring.

After the conduit 12 is connected to the sink 10 by the connector ring 30, a waste disposer unit 36 is connected to the coupling. This is done very simply with the use of a resilient plastic or rubber sealing ring 38. The sealing ring includes two inwardly extending bosses 40 and 42, a top flange 54 and a bottom flange 56. The upper boss 40 fits into the groove 28 in the collar 20 and the lower boss 42 seats in the groove 44 which is provided near the top of the waste disposer unit 36. The assembly is quickly held in place with a worm gear type clamp 46 of the conventional type that includes the strap 48 which is tightened in a worm assembly 50 by a screw 52. The strap 48 is held in position on connector ring 30 by the flanges 54 and 56 which facilitate the use of this type of clamp.

The construction of the present invention is simple and can be readily installed by a home owner without difficulty.

Having thus described my invention, I claim:

1. A coupling device for attaching a waste disposer unit having a circumferential groove near the top thereof to a sink having a drain opening therein, comprising:

substantially cylindrical drain conduit means for inserting through the drain opening in the sink, said drain conduit means including a body, and a flange extending from said body for positioning adjacent the upper surface of said sink bottom around said opening;

a reduced portion on said conduit body forming a coolar seat;

substantially cylindrical collar means for positioning on said collar seat, and having external threads thereon, said threads being substantially co-extensive with the circumference of the conduit body in the assembled position;

a circumferential groove near the bottom of said collar means;

fastening means for fastening said collar means to said collar seat;

connector ring means having internal threads extending from one end part way in the axial direction for engaging the threads on said collar means to lock said drain conduit means to the sink bottom by pulling said flange toward said sink bottom, said connector ring means being capable of connection to said collar means with either end facing the sink bottom to accommodate sink bottoms of different thicknesses;

resilient sealing means having an upper boss extending inwardly therefrom for seating in the groove in said collar means and a lower boss extending inwardly therefrom for seating in the groove in the disposer; and securing means surrounding said sealing ring means for securing said sealing ring means in position and pressing said bosses into sealing engagement with the side walls of said grooves.

2. A coupling device according to claim 1 wherein said connector ring means includes circumferentially spaced rotating means on its surface for rotating said connector ring means.

3. A coupling device according to claim 1 wherein said sealing ring means includes an upper flange and a lower flange; and said securing means includes a strap which fits on said sealing ring means between said flanges.

* * * * *